April 10, 1951 R. S. ROUNTREE ET AL 2,548,068
SUN VISOR FOR MOTOR VEHICLES
Filed Feb. 4, 1948 2 Sheets-Sheet 1
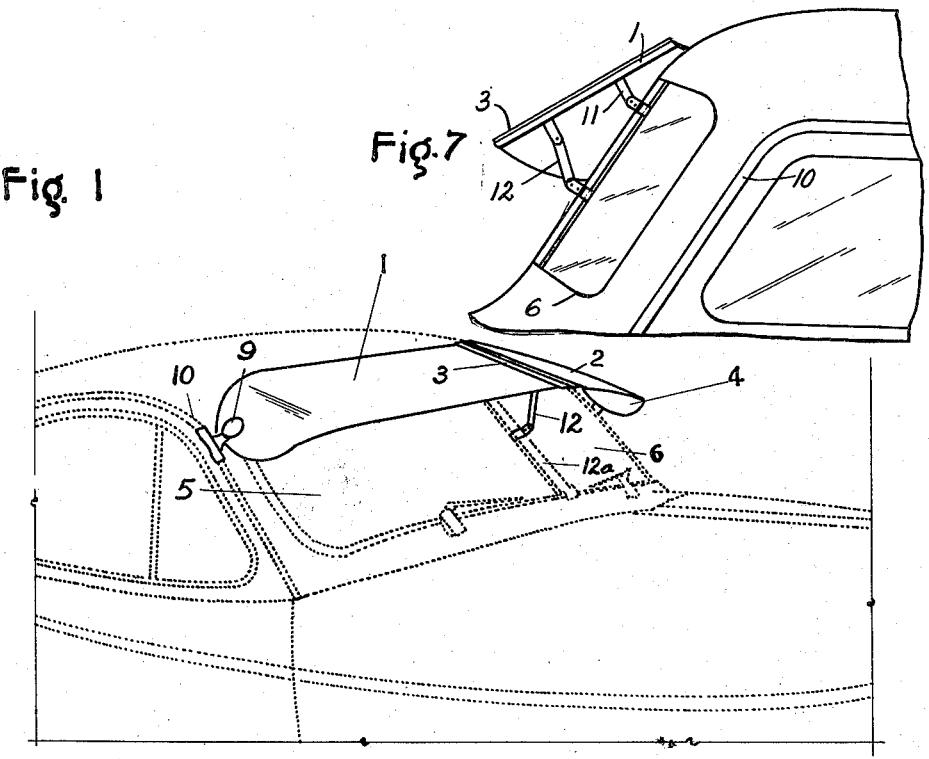
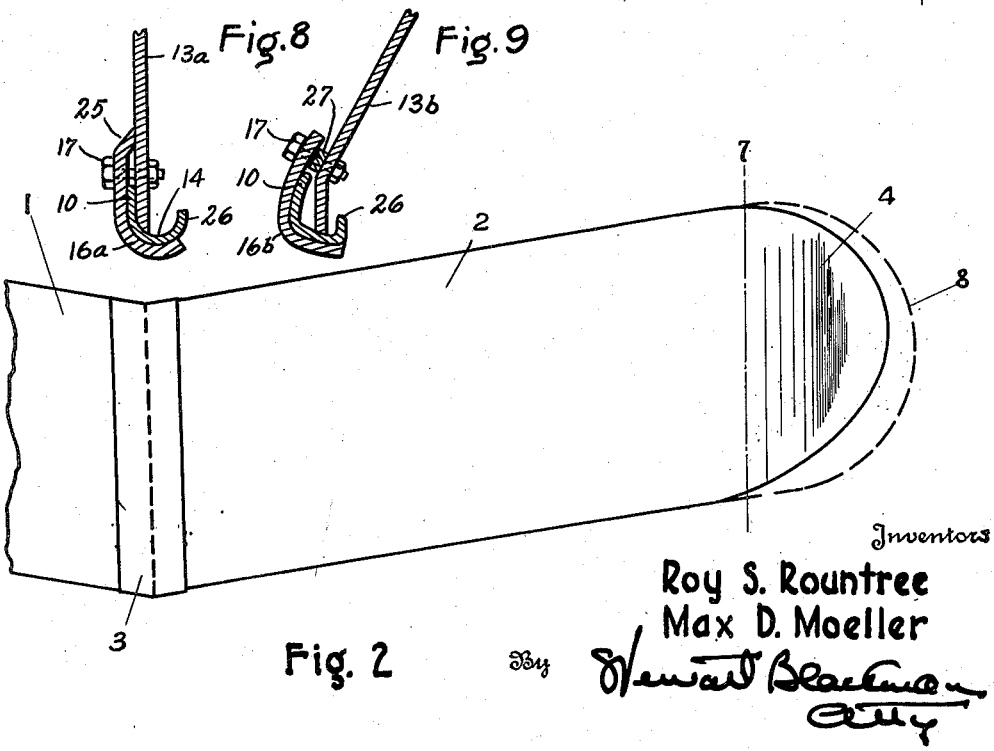
Inventors
Roy S. Rountree
Max D. Moeller April 10, 1951 — R. S. ROUNTREE ET AL — 2,548,068
SUN VISOR FOR MOTOR VEHICLES
Filed Feb. 4, 1948 — 2 Sheets-Sheet 2
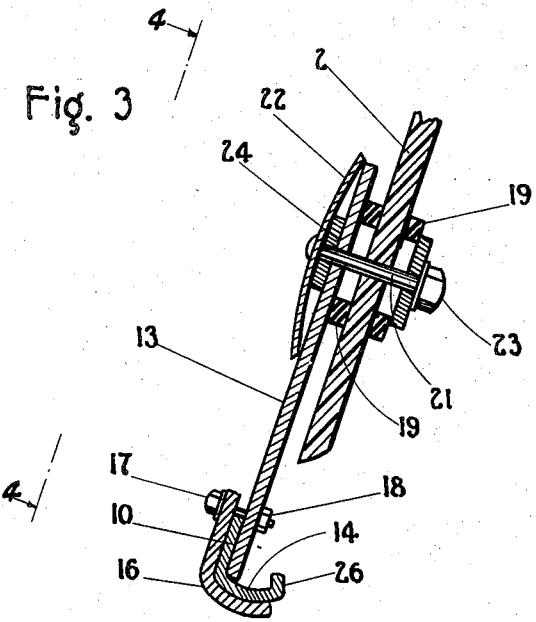
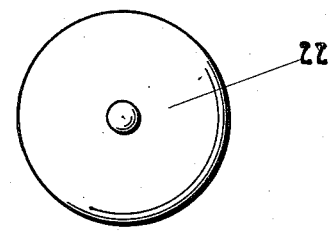
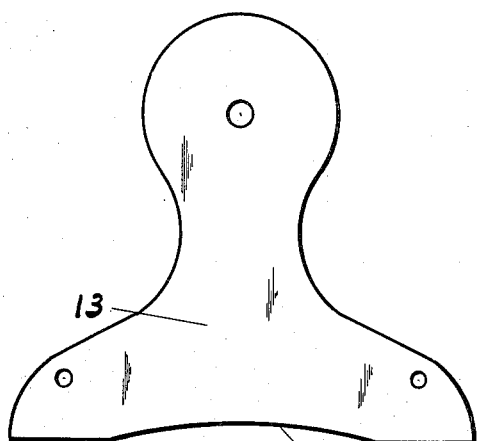
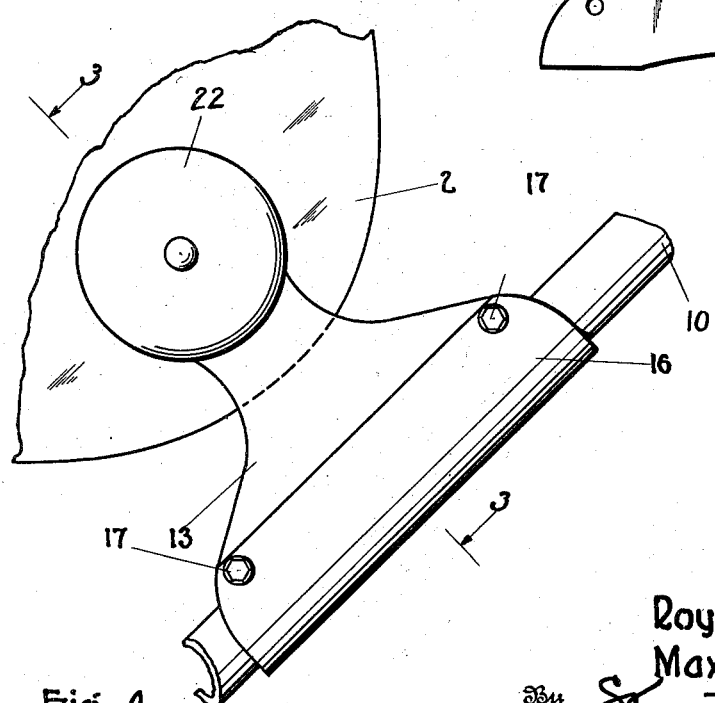
Inventors
Roy S. Rountree
Max D. Moeller Patented Apr. 10, 1951

2,548,068

UNITED STATES PATENT OFFICE 2,548,068

SUN VISOR FOR MOTOR VEHICLES

Roy S. Rountree and Max D. Moeller, Miami, Fla.

Application February 4, 1948, Serial No. 6,198

2 Claims. (Cl. 296—95)

The invention relates to a sun visor for motor vehicles.

The sun visor to which the invention has particular application is of the type which may be detachably secured to the windshield framing structure of an automobile to shield the eyes of the driver and passengers thereof from the glare of the sun, but the invention is not limited within the purview thereof to a vehicle of any specific model or style.

An object of the invention is to provide a sun visor which will be simple in construction and efficient in operation.

Another object of the invention is to provide a sun visor which may be readily attached to and detached from the body structure of a vehicle.

A further object is to provide an accessory of the character described which will be pleasing in appearance and harmonize readily with the body lines of the vehicle to which the visor is applied.

Still another object is to provide a sun visor which may be conveniently adjusted to the desired inclination thereof in relation to the windshield.

Other advantages of the invention will be apparent from the description thereof hereinafter set forth.

According to the invention, the sun visor embodies a flat, transparent and glare-dissipating panel assembly adapted for attachment to the windshield framing structure and inclinable in relation thereto. The visor is turned at the outer ends thereof to provide wing portions whereby to deflect glare impinging upon the visor at angles to the direction of travel of the vehicle.

The visor is carried at the ends thereof by brackets which are seated within the rain gutter troughs of the vehicle and adjustable thereto, and by a central auxiliary bracket arranged on the under side of the visor at the mid portion thereof and secured to the windshield center post, whereby to provide a stable supporting structure for the visor assembly.

The invention is embodied in a sun visor exemplified in the accompanying drawings, in which the views are as follows, like reference numerals referring to identical parts throughout the several views:

Fig. 1, a perspective of the sun visor as applied to a conventional automobile;

Fig. 2, a plan of the visor panel, in part;

Fig. 3, a sectional elevation taken on line 3—3 of Fig. 4 of a visor bracket assembly;

Fig. 4, an elevation of a visor bracket as carried by the rain gutter of the vehicle, taken from line 4—4 of Fig. 3;

Fig. 5, a plan of the assembly bolt head for clamping the visor to the bracket structure;

Fig. 6, an elevation of the bracket supporting post;

Fig. 7, a side elevation showing the auxiliary bracket with a portion of the visor cut away;

Fig. 8, a partial sectional elevation taken through another embodiment of the bracket fastening assembly;

Fig. 9, a partial sectional elevation taken through another modification of the bracket assembly.

The sun visor is formed of a pair of flat panels, 1 and 2 (Fig. 1), the inner ends of which meet in substantially mitered, endwise angular relation, in which they are secured by an overlying connecting strip 3, fastened thereto in any suitable manner (not shown). The angular relation of the visor panels is preferably designed to parallel, substantially, the corresponding angularity of the windshield panels 5 and 6, to afford the maximum glare protection thereto.

The visor panels are formed of a suitable transparent and glare-dissipating material having non-shattering characteristics, such, for example, as "Plexiglas."

At the outer ends thereof, the panels 1 and 2, are curved downwardly to form terminal wing portions 4, whereby to extend the protective area of the visor to shield the occupants of the vehicle from rays impinging thereon at angles oblique to the direction of travel. The wings 4 define a curve, the axis of which lies longitudinally of the vehicle, thereby disposing the wing portions of the visor so as to offer the minimum wind resistance. The curvature of the wings may be developed from a line of curvature, as the line 7 (Fig. 2), lying parallel to the longitudinal axis of the vehicle, the terminal portions of the panels being represented, before bending, by the dotted arc 8.

At the outer ends thereof, the sun visor is carried by a pair of visor brackets, shown generally at 9 (Fig. 1), which are associated with the rain gutters 10, of the vehicle body, in a manner to be hereinafter more specifically described. Centrally thereof, the visor has an auxiliary support consisting of a pair of superposed arms, 11 and 12, fastened to the connecting strip 3 at their upper ends, and to the windshield post 12a at their lower ends.

The visor brackets (Figs. 3, 4, and 6), have a main supporting post 13, adapted at the bottom thereof to be received by the rain gutter 10 so as to seat against the trough 14 thereof. The post has an arcuate bottom edge 15 to facilitate the seating thereof against arcuate portions of the rain gutter. A gutter clamp 16, formed to engage the outer wall of the gutter, has a pair of screw fastenings 17, tightened by nuts 18, to secure the bracket assembly against slidable movement along the trough 14.

The posts 13 carry a visor clamp (Fig. 3), consisting of a pair of cushioning washers 19, between which are gripped the wings 4, the washer assembly being held on the inner side by a closer ring 20, and on the outer side by the upper portion of the post 13. The visor clamp is tightened by a bolt 21, having a concavo-convex circular head 22, and secured by a cap nut 23. A filler ring 24 is interposed between the head 22 and post 13.

By this construction, when the vehicle is under way, wind pressure acting upon the sun visor develops stresses therein which are directly transmitted to the trough 14 of the rain gutter 10, thereby eliminating the tendency toward distortion of the gutter contour through employment of the outer wall of the gutter to receive load imposed by the sun visor. The trough 14 thus functions as a seat against which the post 13 may bear directly to transmit thereto the wind stresses generated in the sun visor, the gutter clamp 16 functioning merely to engage the gutter structure sufficiently to resist slideable movement of the bracket assembly along the rain gutter.

In the embodiment of the gutter clamp shown in Fig. 8, the clamp 16a is provided with an inwardly directed flange 25 along the top edge thereof, to engage the post 13a in clamping relation, this form being adapted to a gutter wall of relatively upright design.

A further modification of the gutter clamp assembly is shown in Fig. 9, wherein the post 13b may be bent inwardly near the bottom thereof for adaptation to gutter contours and vehicle body widths of various shapes and dimensions. This embodiment may have a filler washer 27 interposed between the gutter clamp and the post to effect the parallel clamping alinement of these members.

The invention is thus seen to provide a sun visor for motor vehicles which is simple in arrangement and pleasing in appearance. The construction of the gutter clamp assembly permits the visor brackets to be readily attached to the rain gutter without the drilling thereof and without imposing undue strain upon the outer wall of the gutter structure. The gutter trough is thus utilized to seat the visor and to receive the stresses developed therein by wind pressure exerted thereon.

The construction of the visor brackets further permits the selective adjustment of the visor at a convenient angle in relation to the windshield, and facilitates the positioning of the device along the rain gutter so as to provide a suitable space between the rearmost edge of the visor and the roof of the vehicle whereby to form a discharge outlet for the escape of air passing on the under side of the visor during the forward travel of the vehicle.

The inclination of the wing portions 4, along an axis paralleling the longitudinal dimension of the vehicle disposes the wings along the direction of travel of the vehicle, thereby reducing the wind resistance of the visor.

The assembly of the visor into two panels permits the replacement of one of the panels in the event of damage thereto without requiring the replacement of the entire panel assembly, facilitating, at the same time, the alinement of the visor panels with the angularity of the windshield panels.

Of course, the invention is susceptible of various modifications and changes without departing from the scope thereof, as hereinafter claimed.

We claim:

1. A bracket for the support of an automobile sun visor having a downwardly inclined wing portion at each end thereof, comprising, in combination with the rain gutter of said automobile, a post terminating along the bottom thereof in a concave arcuate edge adapted to seat within said gutter and thereagainst, a gutter clamp engageable with said gutter and secured to said post, a visor clamp formed at the upper end of said post and comprising a pair of inner cushioning washers abutting said post against the inner face thereof and adapted to embrace said wing portion therebetween, a concavo-convex head adapted to bear against said post on the outer face thereof, and means to secure said clamp in gripping relation with said wing portion and said post.

2. A bracket for the support of an automobile sun visor having a downwardly inclined wing portion at each end thereof, comprising, in combination with the rain gutter of said automobile, a post terminating along the bottom thereof in a concave arcuate edge adapted to seat within said gutter and thereagainst, a gutter clamp engageable with said gutter and secured to said post, a visor clamp formed at the upper end of said post and comprising a pair of inner cushioning washers abutting said post against the inner face thereof and adapted to embrace said wing portion therebetween, and a through bolt fastening adapted to secure said wing portion in gripping relation with said post and including a concavo-convex outer head in abutting relation with said post against the outer face thereof.

ROY S. ROUNTREE.
MAX D. MOELLER.

REFERENCES CITED

The following references are of record in the file of this patent:

UNITED STATES PATENTS

| Number | Name | Date |
| --- | --- | --- |
| 1,615,078 | Grisby | Jan. 18, 1927 |
| 1,644,662 | Anderson | Oct. 11, 1927 |
| 2,180,909 | Peckat | Nov. 21, 1939 |
| 2,253,353 | Sharp | Aug. 19, 1941 |
| 2,334,856 | Atkinson | Nov. 23, 1943 |
| 2,447,246 | Groboski et al. | Aug. 17, 1948 |
| 2,500,406 | Greenfield | Mar. 14, 1950 |